United States Patent Office 3,410,670
Patented Nov. 12, 1968

3,410,670
FUEL COMPOSITIONS
William M. Le Suer, Cleveland, Ohio, assignor to The Lubrizol Corporation, Wickliffe, Ohio, a corporation of Ohio
No Drawing. Continuation-in-part of application Ser. No. 357,787, Apr. 6, 1964. This application Jan. 30, 1968, Ser. No. 701,566
17 Claims. (Cl. 44—57)

ABSTRACT OF THE DISCLOSURE

A basic metal composition prepared by carbonating a mixture comprising a phenolic composition and a metal base is useful as an additive in fuels to improve the combustion characteristics of the fuel. The performance of diesel and jet engines is improved by operating the engine on such fuel.

---

This application is a continuation-in-part of copending application Ser. No. 357,787 filed Apr. 6, 1964, now abandoned.

This invention relates to the operation of diesel or jet engines. In a more particular sense it relates to improved fuels for use in jet engines and diesel engines such as are found in ships, automobiles, trucks, tractors, and other automotive equipment.

In the operation of diesel or jet engines, a serious problem is the incomplete combustion of the diesel fuel. Incomplete fuel combustion causes excessive wear of the engine parts and reduces engine efficiency. It also results in the formation of a black exhaust smoke, especially on rapid acceleration of the engine. The black smoke formed from a diesel truck or jet aircraft creates a problem of air pollution and in many localties it constitutes a violation of the local law to so pollute the air.

Accordingly, it is a principal object of this invention to provide a method of operating diesel or jet engines wherein the fuel is more completely burned in the engine.

It is also an object of this invention to provide a method of operating diesel or jet engines whereby the formation of black exhaust smoke is minimized.

It is also an object of this invention to provide improved hydrocarbon fuel, e.g., diesel or jet fuel compositions.

It is further an object of this invention to provide additives useful in hydrocarbon fuels such as diesel or jet fuels to improve their combustion characteristics.

These and other objects are attained in accordance with this invention by providing hydrocarbon fuel containing from about 0.01% to about 5% by weight of an oil-soluble, basic metal composition prepared by the process which comprises carbonating a mixture comprising:

(A) a phenolic composition selected from the class consisting of alkylated phenols having at least about 6 aliphatic carbon atoms and mixtures of a phenol and a polar substance having at least about 12 aliphatic carbon atoms and selected from the class consisting of esters of aliphatic carboxylic acids, alcohols, sulfoxides, amines, and condensation products of an amine and a lower aliphatic aldehyde; and (B) at least about one equivalent of a metal compound selected from the class consisting of alkali and alkaline earth metal oxides and hydroxides.

The compositions useful as the additive in the fuels of this invention, as indicated previously, are basic metal compositions, i.e., they are characterized by at least a signicant degree of basicity as measured by the Reflux Basicity Procedure. This procedure involves refluxing a solution of the composition in a mixed solvent consisting of toluene-isopropanol-$H_2O$ (49:49:0.5 volume ratio) and a measured excess of aqueous hydrochloric acid and back-titrating the excess acid with an aqueous potassium hydroxide solution of know normality. The basicity of the metal composition is expressed in terms of milligrams of KOH which is equivalent to one gram of the composition. For convenience, the basicity determined by this procedure is referred to in the specification as the "reflux base number." The basic metal compositions useful in the fuels of this invention have a reflux base number of at least about 10.

The basic metal compositions are obtained by carbonating a mixture of a phenolic composition as described above and at least one equivalent of a metal base which may be the oxide, the hydroxide, the alcoholate such as methoxide, ethoxide, peroxide, octoxide, or the phenate such as the unsubstituted or alkyl-substituted phenate, of an alkali or alkaline earth metal. The metal is examplified by sodium, lithium, potassium, magnesium, strontium, calcium, and barium. The calcium and the barium oxides and hydroxides are especially preferred because the products derived from them are found to be especially effective for the purposes of this invention.

The phenolic composition described as component A may be about either an alkylated phenol or a mixture of a phenol and one or more of the following substances: esters of aliphatic carboxylic acids, alcohols, sulfoxides, amines, and the condensation products of an amine with a lower aliphatic aldehyde. The alkylated phenols useful as component A should have at least about 6 aliphatic carbon atoms. They may contain one or more alkyl substituents on the aromatic nucleus. Specific examples of the alkylated phenols include hexylphenol, heptylphenol, dodecylphenol, dihexylphenol, diisopropylphenol, tributylphenol, didodecylphenol, octadecylphenol, dioctylphenol, polypropene (molecular weight of 150)-substituted phenol, polyisobutene (molecular weight of 350)-substituted phenol, cyclohexylphenol, dodecyl cyclohexylphenol, behenylphenol, and the like. In some instances, a polar group such as halo, nitro, or alkoxy group may be present in the alkyl substituent or the aromatic nucleus of the alkylated phenols. Bis-phenols and other alkylated hydroxy-aromatic compounds such as alkylated naphthols are within the genus of phenols and are contemplated for use in preparing the additives of this invention. The alkylated phenols preferred for use herein are the mono- and di-alkylated phenols in which the alkyl substituent contains from about 6 to 200 carbon atoms.

As indicated previously, the phenolic composition of A may be a mixture of a phenol and a polar substance described above. The phenol useful in such mixture may be any of the alkylated phenols described above or one having no alkyl substituents or having one or more lower alkyl substituents, i.e., having less than 6 carbon atoms. Thus, in addition to the examples of the alkylated phenols given above, other phenols useful in such mixture may be phenol, naphthol, cresol, catechol, isopropylphenol, diethylphenol, alpha-methyl-beta-naphthol, beta-butyl-alpha-naphthol, 4,4'-methylene-bis-phenol, etc.

The polar substances useful in admixture with the phenol should contain at least about 12 aliphatic carbon atoms and may be any one or a mixture of esters of aliphatic carboxylic acids, alcohols, sulfoxides, amines, and condensation products of an amine and lower aliphatic aldehyde. The esters of aliphatic carboxylic acids are preferably esters of fatty acids having at least about 12 aliphatic carbon atoms, usually up to about 30 aliphatic carbon atoms, in the fatty radical. The ester radical, on the other hand, may be derived from a lower alkyl group such as methyl, ethyl, or propyl group, or it may likewise be derived from a higher alkyl group having up to about 30 carbon atoms. Examples of the esters are methyl stearate, cyclohexyl oleate, sorbital mono-oleate, butyl stearate, ethyl laurate, allyl myristate, ethyl palmitate, diester of ethylene glycol and stearic acid, tetraester of pentaerythritol with oleic acid, etc. Esters of commercially available fatty acids or acid mixtures are especially preferred because of their availability and low cost. They include, for example, sperm oil, tall oil, methyl ester of tall oil acid, and behenyl ester of tall oil acid.

Alcohols useful in admixture with the phenol for preparing the basic metal compositions are exemplified by dodecyl alcohol, octadecyl alcohol, sperm alcohol (obtained by the hydrolysis of sperm oil), behenyl alcohol, oleyl alcohol, and "oxo" alcohols such as are obtained by the reaction of an olefin having at least 12 carbon atoms with carbon monoxide and hydrogen. They may contain as many as 30 aliphatic carbon atoms.

Sulfoxides useful in admixture with the phenol for preparing the basic metal compositions are illustrated by dodecyl methyl sulfoxide, didodecyl sulfoxide, hexyl octadecyl sulfoxide, dibehenyl sulfoxide, and dioctadecyl sulfoxide.

Amines useful in admixture with the phenol for preparing the basic metal compositions may be primary, secondary, or tertiary amines. They include, for example, dodecylamine, didodecylamine, N-methyl dodecylamine, N-benzyl octadecylamine, dicyclohexylamine, tridecylamine, N-butyl laurylamine, and N,N-dimethyl pentadecylamine. They also include polyamines such as N-octadecyl propylene diamine, N-decyl propylene diamine, tridecyl-substituted diethylene triamine and octyl-substituted tetraethylene pentamine. The preferred polyamines are N-alkyl-substituted alkylene amines such as substituted ethylene diamines, trimethylene diamines, tetramethylene diamines, triethylene tetramines, pentaethylene hexamines, and other polyalkylene polyamines. The alkyl group of such N-alkyl-substituted polyamines may contain from about 12 to 30 carbon atoms. Other polyamines having an acyl group, such as characterizes imidazolines, on one or some of the amino groups are also useful. They are illustrated by the reaction product of one mole of oleic acid with one mole of triethylene tetramine. Still other amines useful herein may be hydroxyalkyl amines, including polyamines, in which the alkyl radical has up to about 6 carbon atoms. Such hydroxyalkyl amines are formed by the reaction of an epoxide such as ethylene oxide, propylene oxide, epichlorohydrin with dodecyl amine, N-octadecyl trimethylene diamine, or didecyl-amine.

Condensation products of the above-illustrated amines with a lower aliphatic aldehyde, i.e., one having less than about 6 carbon atoms, likewise are useful in admixture with the phenol for preparing the basic metal compositions of this invention. Examples of the aldehydes preferred for use herein are formaldehyde (paraformaldehyde or aqueous formalin), acetaldehyde, propionaldehyde, butyraldehyde, or the like. The condensation products are readily obtained by mixing one mole of the amine with from 0.5 to about 5 moles of the aldehyde and then heating the mixture at a temperature from about 50° C. to 250° C. or higher. Where the amine or the aldehyde is a solid, the condensation is best carried out in the presence of a diluent such as mineral oil, xylene, benzene, naphtha, chlorobenzene or an inert solvent. The condensation is promoted by the presence in the reaction mixture of a small amount, at least about 0.01% and usually less than 10% by weight of the aldehyde, of a basic catalyst such as an alkali metal hydroxide or an alkaline earth metal hydroxide, e.g., sodium hydroxide, potassium hydroxide, calcium hydroxide, or barium hydroxide. The precise nature of the condensation products is not known. The condensation products prepared from a mixture of from 2 to 4 moles of formaldehyde and one mole of an N-alkyl alkylenediamine in which the alkyl radical has from about 12 to 30 carbon atoms and the alkylene radical has from 2 to 4 carbon atoms are especially useful.

The relative proportions of the phenol to the polar substance in the mixture useful as the phenolic composition of A may vary from about 0.1 to 10 equivalents of the phenol per equivalent of the polar substance. In most instances, the mixture contains from about 0.2 to about 5 equivalents of the phenol to each equivalent of the polar substance.

To prepare the basic metal compositions useful as additives in the diesel fuels of this invention, the phenolic composition of A and the metal compound of B are mixed and the mixture is treated with carbon dioxide at a temperature of at least about 50° C., preferably from 80° C. to 250° C. The upper temperature limit is determined by the decomposition point of the reaction mixture. The carbonation is preferably carried out in the presence of a diluent which is usually a fluid solvent in which at least one of the reactants is soluble or the product is soluble. Solvents commonly useful for this purpose are benzene, toluene, naphtha, dodecane, xylene, and mineral oil. An especially useful solvent is one having a low pour point, e.g., below about 40° C. It is exemplified by a haloaryl or alkaryl hydrocarbon such as chlorobenzene, mesitylene, p-cymene, etc. The alkaryl hydrocarbon may have up to six alkyl substituents per aryl nucleus in which each alkyl has up to 12 carbon atoms. The relative amounts of the phenolic composition of A to the metal compound of B useful in preparing the basic metal compositions are such that at least one equivalent of the metal compound is used per equivalent of the phenolic composition. There appears to be no upper limit on the amount of the metal compound which may be used in the process. For practical reasons, however, the amount of the metal compound to be used in the process seldom exceeds 25 equivalents per equivalent of the phenolic composition. A greater amount of the metal compound may be used but there appears to be no particular advantage attending such use. In most instances, from about 1.5 to about 15 equivalents of the metal compound is used per equivalent of the phenolic composition.

The equivalent weight of the phenolic composition depends upon the number of functional groups in the molecule and the equivalent weight of the metal compound depends upon the valence of the metal and the number of the metal radicals in the molecule. Thus, the equivalent weight of a phenol is determined by the number of hydroxy radicals attached to the aromatic nucleus; the equivalent weight of a carboxylic acid ester is determined by the number of ester radicals in the molecule; the equivalent weight of an alcohol is determined by the number of hydroxy radicals in the molecule; the equivalent weight of a sulfoxide is determined by the number of sulfoxide radicals in the molecule; the equivalent weight of an amine is determined by the number of amino radicals in the molecule; and the equivalent weight of the condensation product of an amine and a lower aldehyde is determined by the number of the nitrogen radicals derived from the amine in the molecule. For instance, the equivalent weight of sperm oil is its molecular weight (as determined by, e.g., its saponification equivalent); that of oleyl alcohol is its molecular weight; that of N-alkyl alkylene diamine is one-half its molecular weight; that of distearyl ester of ethylene glycol is one-half its molecular weight; that of heptylphenol is its molecular weight; that of 2,2'-didecyl-4,4'-methylenebisphenol is one-half its molecular weight; that of didodecyl sulfoxide is its molecular weight; that of the condensation product of N-alkyl tetraethylene pentamine and aldehyde is one-fifth its molecular weight; that of an alkali metal hydroxide is its molecular weight; that of an alkali metal oxide is one-half its molecular weight; and that of an alkaline earth metal oxide or hydroxide is one-half its molecular weight.

It will be noted that where the phenolic composition of A is a mixture of a phenol and a polar substance, the relative amounts of the metal compound of B to the phenolic composition of A have reference to the total number of equivalents of the phenol and the polar substance in the mixture. To illustrate, where the ratio of equivalents of the metal compound of B to the phenolic composition of A is 2:1 and the phenolic composition of A is a mixture of a phenol and a polar substance in amounts corresponding to a ratio of equivalents of 1:4, respectively, the reaction mixture will comprise one equivalent of a phenol, 4 equivalents of a polar substance, and 10 equivalents of a metal compound.

As regards the carbonation step, it has been noted that the mixture of the phenolic composition of A and the metal compound of B, either in the presence of or in the absence of a diluent, is usually a heterogeneous mixture. As carbonation proceeds, the metal compound becomes solubilized in the organic phase and the carbonated product eventually becomes a homogeneous composition which is readily soluble in hydrocarbon solvents such as benzene, xylene, or mineral oil. The mechanism of the formation of the homogeneous product is not fully understood. It is believed, however, that carbonation converts the metal compound to a carbonate or bicarbonate which forms with the phenolic composition a homogeneous complex. It is not necessary in most instances that all of the metal compound present in the process mixture should be so converted by carbonation in order to produce a soluble homogeneous product. Such product is often obtained when as little as 75% of the metal compound is carbonated. For the sake of convenient reference, the term "basic metal composition" is meant to describe the homogeneous carbonated product without a specific reference to the degree of conversion of the metal compound by carbonation. It is further noted that the basic metal compositions obtained by the above process should have a reflux base number of at least about 10.

The following examples illustrate the preparation of the additives of the invention.

EXAMPLE 1

A mixture of 630 grams (2 equivalents) of a rosin amine (consisting essentially of dehydroabietyl amine) having a nitrogen content of 44% and 245 grams (1.2 equivalents) of heptylphenol having a hydroxyl content of 8.3% is heated to 90° C. and then mixed with 230 grams (3 equivalents) of barium oxide at 90° C.–140° C. The mixture is purged with nitrogen at 140° C. A portion, 600 grams, of the mixture is diluted with 400 grams of mineral oil and filtered. The filtrate is blown with carbon dioxide, diluted with benzene, heated at the reflux temperature, heated to remove benzene, mixed with xylene and filtered. The filtrate, a 20% xylene solution of the product, has a barium sulfate ash content of 25.1%, a nitrogen content of 2%, and a reflux base number of 119.

EXAMPLE 2

An amine-aldehyde condensation product is obtained as follows: Formaldehyde (420 grams, 14 moles) is added in small increments to a mixture of N-octadecyl propylene diamine (1392 grams, 4 moles), mineral oil (3000 grams), water (200 grams) and calcium hydroxide (42 grams, condensation catalyst) at the reflux temperature, 100°–105° C. The rate of addition of formaldehyde is such as to avoid excessive foaming. The mixture is heated at reflux temperature for 1 hour, slowly heated to 155° C., and blown with nitrogen at 150°–155° C. for 2 hours to remove all volatile components. It is then filtered. The filtrate, 93% of the theoretical yield, is a 65.4% oil solution of the amine aldehyde condensation product having a nitrogen content of 2.4%. A portion (1850 grams, 3.2 equivalents of nitrogen) is mixed with heptylphenol (185 grams, 0.97 equivalent), mineral oil (1485 grams) and 90% pure barium oxide (1060 grams, 12.6 equivalents) and heated to 70° C. Water (500 grams) is added throughout a period of 1 hour at 70°–100° C. The mixture is heated at 110°–115° C. for 4.75 hours and then to 150° C. Thereafter it is carbonated at 140°–150° C. and filtered. The filtrate is a 57.8% oil solution of the basic metal composition having a nitrogen content of 0.87% and a barium sulfate ash content of 29.5%.

EXAMPLE 3

A mixture of 423 grams (1 equivalent) of sperm oil, 123 grams (0.602 equivalent) of heptylphenol, 1214 grams of mineral oil and 452 grams of water is treated at 70° C. with 612 grams (8 equivalents) of barium oxide. The mixture is stirred at the reflux temperature for 1 hour and then at 150° C. while carbon dioxide is bubbled into the mixture beneath its surface. The carbonated product is filtered and the filtrate has a sulfate ash content of 35%.

EXAMPLE 4

A partially acylated polyamine reactant is prepared as follows: A mixture (565 parts by weight) of an alkylene amine mixture consisting of triethylene tetramine and diethylene triamine in weight ratio of 3:1 is added at 20°–80° C. to a mixture of equivalent amounts of a naphthenic acid having an acid number of 180 (1270 parts) and oleic acid (1110 parts; the total quantity of the two acids used is such as to provide one equivalent for each two equivalents of the amine mixture used). The reaction is exothermic. The mixture is blown with nitrogen while it is being heated to 240° C. in 4.5 hours and thereafter heated at this temperature for 2 hours. Water is collected as the distillate. To the above residue ethylene oxide (140 parts) is added at 170°–180° C. within a period of 2 hours while nitrogen is bubbled through the reaction mixture. The reaction mixture is then blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups. A portion of the above xylene solution (789 grams, 3 equivalents of nitrogen) is heated to 150° C./2 mm. to distil off xylene and is then mixed with heptylphenyl (having a hydroxyl content of 8.3%; 367 grams, 1.8 equivalents). To this mixture there is added 345 grams (4.5 equivalents) of barium oxide in small increments at 90°–111° C. The mixture is heated at 90°–120° C. for 2.5 hours and blown with carbon dioxide for 1.75 hours. It is diluted with 130 grams of xylene, heated at 150° C. for 3.5 hours. It is then diluted with 20% of its weight of xylene and filtered. The filtrate has a barium sulfate ash content of 33.2%, a nitrogen content of 3.52%, and reflux base number of 134.

EXAMPLE 5

A sulfoxide is prepared by treating a polyisobutylene of 750 average molecular weight with 47.5 percent of its weight of $SOCl_2$ for 4.5 hours at 200°–220° C. A mixture of 787 grams (1.0 equivalent) of this sulfoxide, 124 grams (0.6 equivalent) of diisobutyl phenol, 550 grams of mineral oil and 200 grams of water is warmed to 70° C. and then treated with 306 grams (4.0 equivalents) of barium oxide. This mixture is heated at reflux temperature for one hour and then treated at 150° C. with carbon dioxide until the mixture is substantially neutral. The resulting mixture is filtered to yield a clear oil-soluble liquid having a barium sulfate ash content of 22.8%.

EXAMPLE 6

To a mixture of 268 grams (1.0 equivalent) of oleyl alcohol, 675 grams of mineral oil, 124 grams (0.6 equivalent) of diisobutyl phenol, and 146 grams of water, at 70° C. there is added 308 grams (4.0 equivalents) of barium oxide. This mixture is heated at reflux temperature for one hour, then at 150° C. while a stream of carbon dioxide is bubbled through the mixture until it is substantially neutral. The thus acidified mixture is filtered and the clear brown oil-soluble filtrate found to have a barium sulfate ash content of 29.8%.

EXAMPLE 7

A mixture of 268 grams (1.0 equivalent) of oleyl alcohol, 90 grams (0.6 equivalent) of tertiary-butyl phenol, 1114 grams of mineral oil and 190 grams of water is warmed to 70° C., treated with 306 grams (4.0 equivalents) of barium oxide and then heated to 150° C. A stream of carbon dioxide is bubbled into the mixture at this latter temperature until the mixture is substantially neutral. Filtration through Hyflo yields a clear brown oil-solube fitrate having a barium sulfate ash content of 23.4%.

EXAMPLE 8

To a mixture of 268 grams (1.0 equivalent) of oleyl alcohol, 124 grams (0.6 equivalent) of heptyl phenol, 1034 grams of mineral oil, and 190 grams of water there is added at 70° C. 306 grams (4.0 equivalents) of barium oxide. This mixture is heated at reflux temperature for an hour and then treated with sulfur dioxide at 150° C. until the mixture is acidic. The mixture is filtered through Hyflo to yield a product having a barium sulfate ash content of 20.9%.

EXAMPLE 9

To a mixture of 915 grams (2.2 equivaents) of a sul-alcohol, 124 grams (0.6 equivalent) of heptyl phenol, 988 grams of mineral oil and 160 grams of water there is added 168 grams (4.0 equivalents) of lithium hydroxide monohydrate. This is heated at reflux temperature for an hour and then treated with carbon dioxide at 150° C. until it is substantially neutral. Filtration of this carbonated mixture yields a liquid having a lithium sulfate content of 12.7%.

EXAMPLE 10

To a mixture of 500 grams (1.0 equivalent) of polyisobutylphenoxyethanol, 124 grams (0.6 equivalent) of heptyl phenol, 848 grams of mineral oil and 190 grams of water there is added at 70° C., 306 grams (4.0 equivalents) of barium oxide. This mixture is heated at reflux temperature for an hour at 150° C. while bubbling carbon dioxide beneath the surface for three hours. The carbonated mixture is filtered through Hyflo to yield a liquid product having a barium sulfate ash content of 23.8%.

EXAMPLE 11

A mixture of 423 grams (1.0 equivalent) of sperm oil, 124 grams (0.6 equivalent) of diisobutyl phenol, 520 grams of mineral oil and 146 grams of water is prepared, heated to 70° C. and then treated with 308 grams (4.0 equivalents) of barium oxide. This mixture is refluxed for an hour then dried by heating to 150° C. and carbonated by treatment with carbon dioxide at this temperature until it is slightly acidic. Filtration of this material yields a clear light brown, non-viscous liquid having a barium sulfate ash content of 31.2%.

EXAMPLE 12

A mixture of 1269 grams (3.0 equivalents) of sperm oil, 522 grams (1.8 equivalents) of a condensation product of one equivalent of heptylphenol and 0.38 equivalent of formaldehyde, 2169 grams of mineral oil, 540 grams of water is treated at 70° C. with 1134 grams (14.8 equivalents) of barium oxide. This mixture is stirred at reflux temperature for one hour then at 150° C. while carbon dioxide is bubbled beneath the surface. Filtration yields a clear liquid having a barium sulfate ash content of 32.7%.

EXAMPLE 13

To a mixture of 915 grams (2.2 equivaents) of a sulfurized sperm oil, 273 grams (1.3 equivalents) of diisobutyl phenol, 1715 grams of mineral oil, and 396 grams of water there is added at 70° C. 833 grams (10.8 equivalents) of barium oxide. This mixture is heated at reflux temperature for an hour and then at 150° C. at which temperature carbon dioxide is bubbled through the mixture until it is substantially neutral. The mixture is filtered to yield a liquid having a barium sulfate ash content of 28.7%.

EXAMPLE 14

To a mixture of 174 grams (1.0 equivalent) of N-octadecyl propylene diamine, 124 grams (0.6 equivalent) of diisobutyl phenol, 766 grams of mineral oil, and 146 grams of water there is added 306 grams (4.0 equivalents) of barium oxide and the whole is refluxed for an hour. Water is removed by raising the temperature to 150° C. whereupon carbon dioxide is bubbled through the mixture at this temperature until it is substantially neutral. The mixture is filtered to yield a clear oil-soluble liquid having a barium sulfate ash content of 28.9%.

EXAMPLE 15

To a mixture of 516 grams (2.0 equivalents) of an N-octadecyl propylene diamine-ethylene oxide condensation product, 1776 grams of mineral oil and 360 grams of water there is added 756 grams (9.9 equivalents) of barium oxide. After refluxing this mixture for one hour the temperature is raised to 150° C. and carbon dioxide is bubbled through the mixture until it is substantially neutral. Filtration yields a liquid product having a barium sulfate ash content of 29.6%.

EXAMPLE 16

To a mixture of 408 grams (2 equivalents) of heptyl phenol having a hydroxy content of 8.3% and 264 grams of xylene there is added 383 grams (5 equivalents) of barium oxide in small increments at 85°–100° C. Water, 6 grams, is added and the resulting mixture is carbonated at 100°–130° C. and then filtered. The filtrate is heated to 100 C. and then diluted with xylene to a 25% xylene solution. This solution is found to have a barium sulfate ash content of 41% and a reflux base number of 137.

EXAMPLE 17

A 65.4% oil solution of the amine aldehyde condensation product of Example 2 (1400 grams, 2.4 equivalents), heptyl phenol (140 grams, 0.73 equivalent), and barium oxide (368 grams, 4.78 equivalents) is heated to 70° C. Water, 250 grams, is added throughout a period of one hour at 70°–100° C. The mixture is heated at the reflux temperature of 110°–115° C., for four hours and then at 150°–155° C. for 0.5 hour. It is then blown with carbon dioxide at 140–150° C. and filtered. The filtrate is a 47% oil solution of the desired product and has a sulfate ash content of 27.8%, a nitrogen content of 1.65%, and a reflux base number of 78.

EXAMPLE 18

The procedure of Example 17 is repeated except that the amount of barium oxide used is 1091 grams (14.2 equivalents) and that mineral oil, 1041 grams, is added to the reaction mixture before carbonation. The product is a 50% oil solution and has a barium sulfate ash content of 36.1%, a nitrogen content of 0.83%, and reflux base number of 168.

EXAMPLE 19

A mixture of polyisobutene (molecular weight of 300)-substituted phenol having a hydroxy content of 3.76% (200 grams, 0.44 equivalent) and heptyl phenol having a hydroxy content of 8.3% (200 grams, 0.98 equivalent), and xylene (200 grams) is heated to 80° C. whereupon barium oxide (218 grams, 2.84 equivalents) is added to the mixture in small increments at 80°–104° C. Water, 10 grams, is added and the resulting mixture is carbonated and nitrogen blown at 148° C. for two hours and twenty minutes. It is filtered. The filtrate is heated to 165°/12 mm. and the residue is diluted with xylene solution. The xylene solution is found to have a barium sulfate ash content of 36.7% and a reflux base number of 171.

EXAMPLE 20

A mixture of 65.4% mineral oil solution of the amine-aldehyde condensation product of Example 2 (1400 grams, 2.4 equivalents), heptylphenol (281 grams, 1.46 equivalents), mineral oil (1636 grams), barium oxide (893 grams, 11.6 equivalents) is heated to 70° C. Water (500 grams) is added in one hour at 70°–110° C. The mixture is heated at reflux temperature (110°–115° C. for 4 hours, dried by heating it to 150 °C. and then at 145°–150° C. for 0.5 hour. It is blown with carbon dioxide at 145°–150° C. until it is substantially neutral to phenolphthalein and then filtered. The filtrate is a 58% oil solution of the product and has a barium sulfate ash content of 27.3% and a reflux base number of 126.

The basic metal compositions prepared by the above process are useful as the additive in hydrocarbon fuels. The hydrocarbon fuels in which the additives are useful include for the most part diesel fuels, gasolines, and various hydrocarbon mixtures known to be useful in diesel, gasoline, or jet engines. The additives are found to be effective in preventing the deposition of sludge- or varnish-like deposits in the engine in which the fuel is used. They are also effective in rendering the fuel more readily combustible. Fuels in which the additive of this invention is used may also contain other commonly used additives. Such additives include, for instance, color stabilizers, anti-oxidants, rust-inhibitors, dispersants, etc. In many instances, diesel fuels may contain from 0.001% to about 2% (by weight) of one or more of such additives. Such additives may be illustrated by metal detergents such as barium didodecylbenzene sulfonate, calcium salt of the hydrolyzed acidic product of polyisobutene having a molecular weight of 1000 and phosphorus pentasulfide, magnesium mahogany sulfonate or basic alkaline earth metal sulfonate complexes. Examples of other additives are tertiary-dodecyl amine, the imidazoline obtained by the reactions of oleic acid and diethylene triamine or triethylene tetramine or the like.

The basic metal compositions may be incorporated in the fuel simply by blending a desired amount of the additive with the fuel. Alternately, a concentrate may be obtained by dissolving the additive in a solvent such as xylene, toluene, or mineral oil and then mixing the concentrate with the diesel fuel. The concentrate may contain as little as 5% (by weight) or less of the solvent or as much as 90% or more of the solvent. On the other hand, the final diesel fuel usually contains from about 0.01% to 5% of the additive. Ordinarily, the diesel fuel contains from 0.1% to 2% of the additive.

The improved combustion characteristics of diesel fuels containing the additives are also indicated by a significantly reduced tendency of the engine to form black exhaust smoke. The latter advantages of such fuels are demonstrated by the following engine test. The test involves operating a single cylinder, 4-cycle diesel engine having a compression ratio of 19:1 under the following conditions: engine speed, 1500±10 r.p.m.; fuel rate, 2.7±0.04 lbs. per hour; engine load, approximately 6 brake horsepower; air:fuel ratio, approximately 19:1; and sump oil temperature, 131±3° F. The engine is equipped with a "Smoke Tube" apparatus for measuring the black exhaust smoke by allowing the exhaust gas to pass through a glass tube (outside diameter of 0.7 inch) in which the smoke is collected on the inside wall of the tube. The effectiveness of the additive to prevent the formation of black smoke is rated by comparing the tube with a set of standard tubes having various amounts of deposits and rated on a numerical scale of 0 to 10, 0 being indicative of no deposit and 10 being indicative of heavy deposit. The engine is also equipped with another apparatus ("Smoke Spot" apparatus) for measuring the black exhaust smoke by allowing the exhaust gas to pass through a white filter paper. The amount of the black deposit on the filter paper is also an indication of the effectiveness of the additive. The deposit likewise is rated by comparing the filter paper with a set of standards, i.e., papers having various amounts of deposits and rated on a numerical scale of 0 to 10, 0 being indicative of no deposit and 10 being indicative of heavy deposit. The base fuel used is a No. 2 diesel fuel containing 1% by weight of sulfur. After a break-in operation to establish equilibrium conditions, the engine is operated on the base fuel until a Smoke Spot Rating is within the range of from 8.5 to 9.0 and the Smoke Tube Rating is within the range of from 6.0 to 6.5. The engine is then operated on the test fuel (which is prepared by incorporating the additive into the base fuel) until the equilibrium operation conditions are again established. The Smoke Tube Rating and the Smoke Spot Rating are recorded at the end of 15 seconds and 30 seconds after the equilibrium conditions are obtained. The results of the test are shown in Table I below.

TABLE I

| Additive | Percent by wt. in fuel | Smoke Spot Rating | | Smoke Tube Rating | |
|---|---|---|---|---|---|
| | | 15 seconds | 30 seconds | 15 seconds | 30 seconds |
| None | | 7.0–8.0 | 8.0–9.0 | 5.5 | 5.5–6.5 |
| Example 1 | 0.8 | 3.5 | 4.0 | 0.5 | 1.0 |
| Example 2 | 0.34 | 5.0 | 6.5 | 2.0 | 2.5 |
| Example 3 | 0.5 | 6.0 | 6.5 | 2.0 | 3.0 |
| Example 4 | 0.5 | 5.5 | 6.5 | 2.0 | 3.0 |
| Example 16 | 0.35 | 5.5 | 6.5 | 2.0 | 2.5 |
| Example 17 | 0.35 | 4.0 | 5.0 | 1.5 | 1.5 |
| Example 18 | 0.35 | 3.5 | 4.5 | 1.5 | 1.5 |
| Example 19 | 0.35 | 5.0 | 6.5 | 3.0 | 3.0 |

What is claimed is:

1. A hydrocarbon fuel containing from about 0.01% to about 5% by weight of an oil-soluble, basic metal composition prepared by the process which comprises carbonating a mixture comprising:
   (A) a phenolic composition selected from the class consisting of alkylated phenols having at least about 6 aliphatic carbon atoms and mixtures of a phenol and a polar substance having at least about 12 aliphatic carbon atoms and selected from the class consisting of esters of aliphatic carboxylic acids, alcohols, sulfoxides, amines and condensation products of an amine and a lower aliphatic aldehyde; and
   (B) at least about one equivalent of a metal compound selected from the class consisting of alkali and alkaline earth metal base.

2. The fuel of claim 1 wherein the phenolic composition of (A) is a mixture of a phenol and a polar substance having at least about 12 aliphatic carbon atoms and selected from the class consisting of esters of aliphatic carboxylic acids, alcohols, sulfoxides, amines and condensation products of an amine and a lower aliphatic aldehyde.

3. The fuel of claim 1 wherein the phenolic composition of (A) is a mixture of an alkylated phenol having up to 200 aliphatic carbon atoms and a fatty acid ester having from about 12 to about 30 aliphatic carbon atoms in the fatty radical.

4. The fuel of claim 1 wherein the phenolic composition of (A) is a mixture of an alkylated phenol having from about 6 to 200 aliphatic carbon atoms and a condensation product and formaldehyde of an amine having from about 6 to 30 aliphatic carbon atoms.

5. The fuel of claim 1 wherein the metal compound of (B) is an alkaline earth metal hydroxide.

6. A hydrocarbon fuel containing from about 0.01% to about 5% by weight of an oil-soluble, basic metal composition prepared by the process which comprises carbonating a mixture comprising:
   (A) an alkylated phenol having from about 6 to 200 aliphatic carbon atoms; and
   (B) at least about one and up to about 25 equivalents of an alkaline earth metal hydroxide.

7. A diesel or jet fuel containing from about 0.01% to about 5% by weight of an oil-soluble, basic metal composition prepared by the process which comprises carbonating a mixture comprising:
(A) one equivalent of a phenolic composition consisting of a mixture of a phenol and a fatty acid ester having from about 12 to 30 aliphatic carbon atoms in the fatty radical, wherein the ratio of equivalents of the alkylated phenol to the fatty acid ester is from about 0.1:1 to 10:1; and
(B) at least about one and up to about 25 equivalents of an alkaline earth metal oxide or hydroxide.

8. The fuel of claim 7 wherein the phenol is an alkylated phenol having from about 6 to 200 aliphatic carbon atoms and the alkaline earth metal is barium.

9. A hydrocarbon fuel containing from about 0.01% to about 5% by weight of an oil-soluble, basic metal composition prepared by the process which comprises carbonating a mixture comprising:
(A) one equivalent of a phenolic composition consisting of a mixture of a phenol and a condensation product of an amine having from about 6 to 30 aliphatic carbon atoms and formaldehyde, wherein the ratio of equivalents of the alkylated phenol to the condensation product is from about 0.1:1 to 10:1; and
(B) at least about one and up to 25 equivalents of an alkaline earth metal base.

10. The fuel of claim 9 wherein the fuel is a diesel fuel and the basic metal composition is prepared by the process which comprises carbonating at a temperature from about 80° C. to the decomposition temperature, an alkaryl hydrocarbon or mineral oil mixture of:
(A) a mixture of one equivalent of an amine-aldehyde condensation product and from about 0.2 to 5 equivalents of a phenol; and
(B) at least about 2 and up to about 25 equivalents of a barium base.

11. A diesel or jet fuel containing from about 0.01% to about 5% by weight of an oil-soluble, basic metal composition prepared by the process which comprises carbonating at a temperature from about 80° C. to the decomposition temperature, an alkaryl hydrocarbon or mineral oil mixture of:
(A) one equivalent of a phenolic composition consisting of a mixture of phenol or an alkylated phenol having from about 6 to about 200 aliphatic carbon atoms and a condensation product of formaldehyde and an N-alkyl alkylene diamine having from about 12 to 30 carbon atoms in the alkyl radical and from 2 to 4 carbon atoms in the alkylene radical, wherein the ratio of equivalents of the alkylated phenol to the condensation product is within the range of from about 0.1:1 to 10:1; and
(B) from about 2 to about 15 equivalents of barium oxide or hydroxide.

12. The diesel or jet fuel of claim 11 wherein the phenolic composition is a mixture of heptylphenol and the condensation product of three moles of formaldehyde and one mole of N-dodecyl trimethylene diamine, wherein the ratio of equivalents of the heptylphenol to the condensation product is within the range of from about 0.5:1 to 5:1.

13. In the method of operating diesel or jet engines having the tendency of forming black exhaust smoke caused by the improper combustion of the fuel, the improvement which comprises burning a fuel having incorporated therein from about 0.01% to about 5% of an oil-soluble, basic metal composition prepared by the process which comprises carbonating a mixture comprising:
(A) a phenolic composition selected from the class consisting of alkylated phenols having at least about 6 aliphatic carbon atoms and mixtures of a phenol and a polar substance having at least about 12 aliphatic carbon atoms and selected from the class consisting of esters of aliphatic carboxylic acids, alcohols, sulfoxides, amines and condensation products of an amine and a lower aliphatic aldehyde, and
(B) at least about one equivalent of a metal compound selected from the class consisting of alkali and alkaline earth metal base.

14. The improvement of claim 13 wherein the phenolic composition is a mixture of a phenol and a polar substance having at least about 12 aliphatic carbon atoms and selected from the class consisting of esters of aliphatic carboxylic acids, alcohols, sulfoxides, amines and condensation products of an amine and a lower aliphatic aldehyde.

15. The improvement of claim 13 wherein the phenolic composition is a mixture of an alkylated phenol having from about 6 to 200 aliphatic carbon atoms and a fatty acid ester having from about 12 to 30 aliphatic carbon atoms in the fatty radical, wherein the ratio of equivalents of the alkylated phenol to the fatty acid ester is from about 0.1:1 to 10:1; and the metal base is an alkaline earth metal hydroxide present in an amount of up to about 25 equivalents per equivalent of the phenolic composition.

16. The improvement of claim 13 wherein the phenolic composition is a mixture of an alkylated phenol having from about 6 to 200 aliphatic carbon atoms and a condensation product of an amine having from about 6 to 30 aliphatic carbon atoms and formaledhyde, wherein the ratio of equivalents of the alkylated phenol to the condensation product is from about 0.1:1 to 10:1; and the metal base is an alkaline earth metal hydroxide present in an amount of up to about 25 equivalents per equivalent of the phenolic composition.

17. The improvement of claim 13 wherein the phenolic composition is a mixture of heptylphenol and the condensation product of three moles of formaldehyde and aliphatic carbon atoms and formaldehyde, wherein the ratio of equivalents of the heptylphenol to the condensation product is within the range of from about 0.5:1 to 5:1; and the metal base is barium hydroxide present in an amount of from about 2 to about 10 equivalents per equivalent of the phenolic composition.

References Cited

UNITED STATES PATENTS

| | | |
|---|---|---|
| 2,834,662 | 5/1958 | Hirschler et al. _____ 44—78 |
| 2,834,663 | 5/1958 | Hinkamp et al. _____ 44—78 |
| 2,834,664 | 5/1958 | Irish et al. _____ 44—78 |
| 3,372,116 | 3/1968 | Meinhardt _____ 252—40 |

DANIEL F. WYMAN, *Primary Examiner.*

Y. H. SMITH, *Assistant Examiner.*

UNITED STATES PATENT OFFICE
CERTIFICATE OF CORRECTION

Patent No. 3,410,670     Dated November 12, 1968

Inventor(s) William M. LeSuer

It is certified that error appears in the above-identified patent and that said Letters Patent are hereby corrected as shown below:

At column 12, line 45, that is Claim 17, line 4, "aliphatic carbon atoms and formaldehyde," should be --one mole of N-dodecyl trimethylene diamine,--

Signed and sealed this 29th day of June 1971.

(SEAL)
Attest:

EDWARD M. FLETCHER, JR.
Attesting Officer

WILLIAM E. SCHUYLER, JR.
Commissioner of Patents